United States Patent [19]

Spitler et al.

[11] 4,384,224
[45] May 17, 1983

[54] DRIVE UNIT FOR FLEXSHAFT VIBRATORS

[75] Inventors: Clem Spitler, Lakeview; Ralph Farkas, Wilmington, both of Ohio

[73] Assignee: Koehring Company, Brookfield, Wis.

[21] Appl. No.: 303,924

[22] Filed: Sep. 21, 1981

Related U.S. Application Data

[63] Continuation of Ser. No. 38,314, May 11, 1979, abandoned.

[51] Int. Cl.³ .............................................. H02K 7/10
[52] U.S. Cl. ...................................... 310/81; 310/42; 310/43; 310/58; 310/89; 310/91
[58] Field of Search ....................... 310/42, 43, 47, 50, 310/51, 52, 62, 63, 46, 59, 88-91, 81, 58, 66, 254, 261, 233, 248; 366/122, 128; 248/560, 603, 604; 74/61, 87; 173/162 R, 162 H; 128/34-36

[56] References Cited

U.S. PATENT DOCUMENTS

| | | | |
|---|---|---|---|
| 3,121,813 | 2/1964 | Pratt | 310/50 |
| 3,180,625 | 4/1965 | Wyzenbeek | 366/122 |
| 3,188,054 | 6/1965 | Mason | 366/128 |
| 3,344,291 | 9/1967 | Pratt | 310/50 |
| 3,457,438 | 7/1969 | Badcock | 310/50 |
| 3,462,623 | 8/1969 | Batson | 310/50 |
| 3,622,821 | 11/1971 | Maffey | 310/60 R |
| 3,652,879 | 3/1972 | Plunkett | 310/50 |
| 3,760,209 | 9/1973 | Hult | 310/90 |
| 3,829,721 | 8/1974 | Rosenthal | 310/47 |
| 3,894,254 | 3/1974 | Holther | 310/66 |
| 4,059,898 | 11/1977 | Adair | 310/43 |

*Primary Examiner*—R. Skudy
*Attorney, Agent, or Firm*—Jerome P. Bloom

[57] ABSTRACT

A drive motor for a flexible drive shaft of an internal vibrator or some other device potentially the source of an electrical shock features a cylindrical structure embodying a field assembly which slip fits in a cylindrical shell which embodies positioning means to which the field assembly and electrically connected commutator brush means may be releasably fixed. Slip fit as a unit into this shell is an armature assembly including a commutator means fixedly mounted directly to and about shaft means intermediate its ends. One end portion of the shaft means provides an electrically non-conductive coupling device for drivingly relating the shaft means to a device which must be powered. The shaft means has affixed thereto the inner races of bearing means to either end of the armature assembly the outer races of which are in direct contact with and protected by electrically non-conductive material forming part of end covers for said cylindrical shell. The end covers are slotted and fan blade means are fixed directly to said shaft means to produce a cooling flow of air about the drive unit components. The drive unit also embodies rubber, electrically non-conductive, motor mounts ring-shaped base portions of which seat about and are contained to the shell by electrically non-conductive end covers. Projecting radially from the ring-shaped base portions are arms spaced by tube elements which provide electrically insulated hand holds for said drive unit between and clear of said end covers.

15 Claims, 9 Drawing Figures

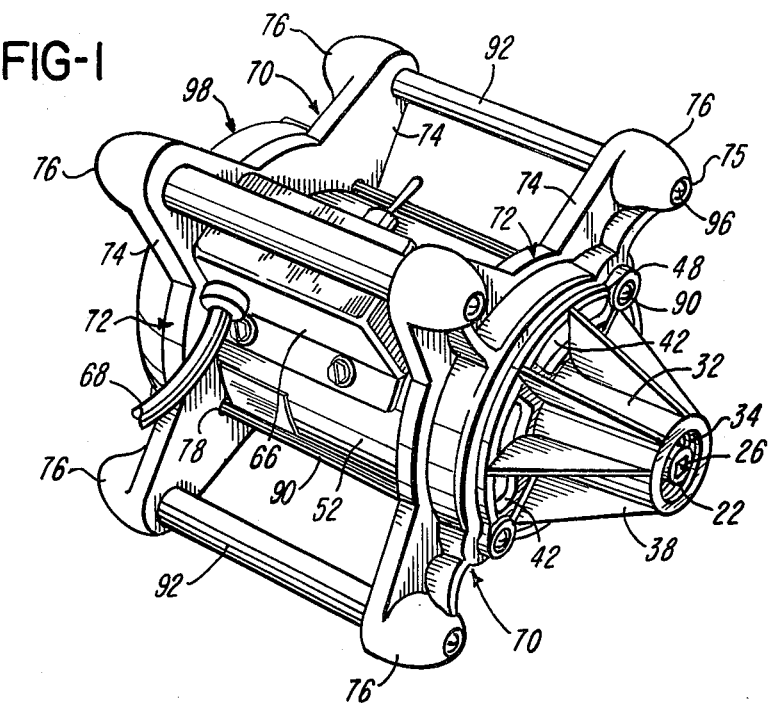
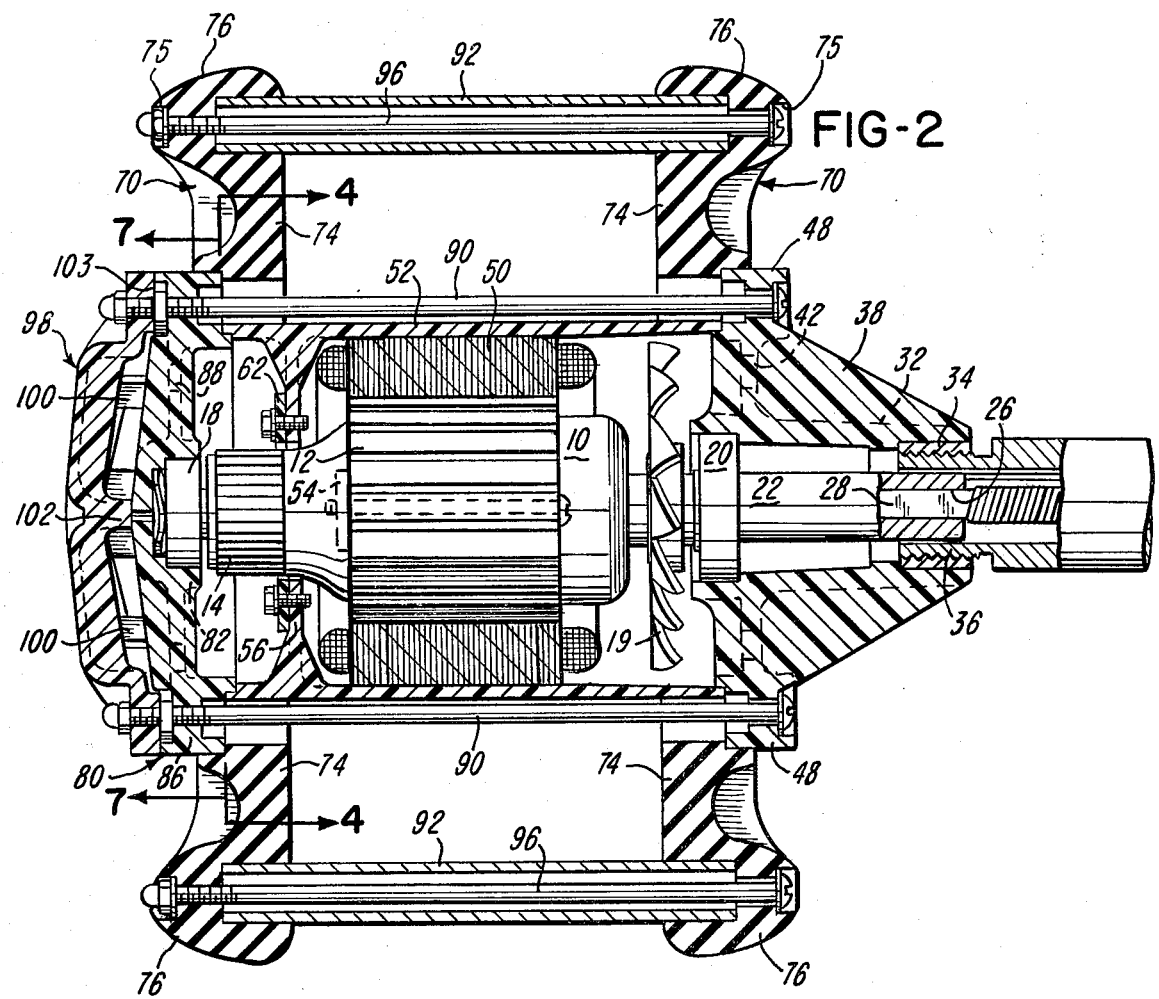

DRIVE UNIT FOR FLEXSHAFT VIBRATORS

This application is a continuation, of U.S. application Ser. No. 06/038,314, filed May 11, 1979, now abandoned.

BACKGROUND OF THE INVENTION

This invention relates to improvements in motor drive drive units particularly those which must be hand held in use. Such units have special advantage for drive of a flexible shaft of an internal vibrator or for that matter drive of any device which in use may be a source of electrical shock to the holder or manipulator of the drive unit.

Much time, money and labor has been applied in efforts to render drive units such as above described safer in use. Efforts have likewise been applied to render such units simpler in construction, easier to fabricate and assemble and adaptable to use in a variety of potentially dangerous environments and lighter in weight. While prior devices applied to similar purposes have been developed with some improvement in the area of concern, they have not been so designed as to satisfy the noted criteria, the target and achievement of embodiments of the present invention.

The prior art of which the present inventors are aware comprise the following U.S. Pats.:
Holther, Jr. U.S. Pat. No. 3,894,254,
Mason, Jr. U.S. Pat. No. 3,188,054,
Wyzenbeek U.S. Pat. No. 3,180,625,
Pratt U.S. Pat. No. 3,344,291,
Batson et al U.S. Pat. No. 3,462,623,
Hult U.S. Pat. No. 3,760,209,
Adair U.S. Pat. No. 4,059,898.

SUMMARY OF THE INVENTION

The present invention provides a drive motor of the type described which is light in weight, comprised of minimal structure, easy to assemble and safer in use, the armature assembly thereof being electrically isolated. The unit also features electrically non-conductive motor mounts at and about peripheral portions thereof, including radially projected arms which clamp therebetween spacer tubes serving as hand holds. The drive element of the unit which serves to connect the same to a device to be operated is made so as to embody an electrical non-conductive portion of the length thereof which electrically isolates the armature assembly of the unit from the connected device.

In particularly preferred embodiments the shell as well as the cover are formed of electrically non-conductive material, for example, Lexan.

A primary object of the invention is to provide a motor drive unit which is constructed of a minimal number of easily fabricated parts, easy to assembly and safer in use.

Another object is to provide a drive unit of the type described wherein the armature assembly is electrically isolated from the driven device.

A further object is to provide a motor drive unit in segments which are readily slip fit, one to another.

An additional object is to provide a hand held motor drive unit with improved resilient motor mounts which are slip fit to a shell defining the peripheral wall of the unit housing and positioned thereon by electrically non-conductive end cover portions of said housing as hand hold elements are applied to maintain said mounts about and spaced longitudinally of said shell between said end covers.

Another object is to provide a drive motor unit and components thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein are shown some but not necessarily the only forms of embodiment of the invention, FIG. 1 is a perspective view of a drive unit providing one embodiment of the present invention;

FIG. 2 is a longitudinal section thereof;

Like parts are indicated by similar characters of reference throughout the several views.

DESCRIPTION OF THE ILLUSTRATED EMBODIMENT

Figure 3:
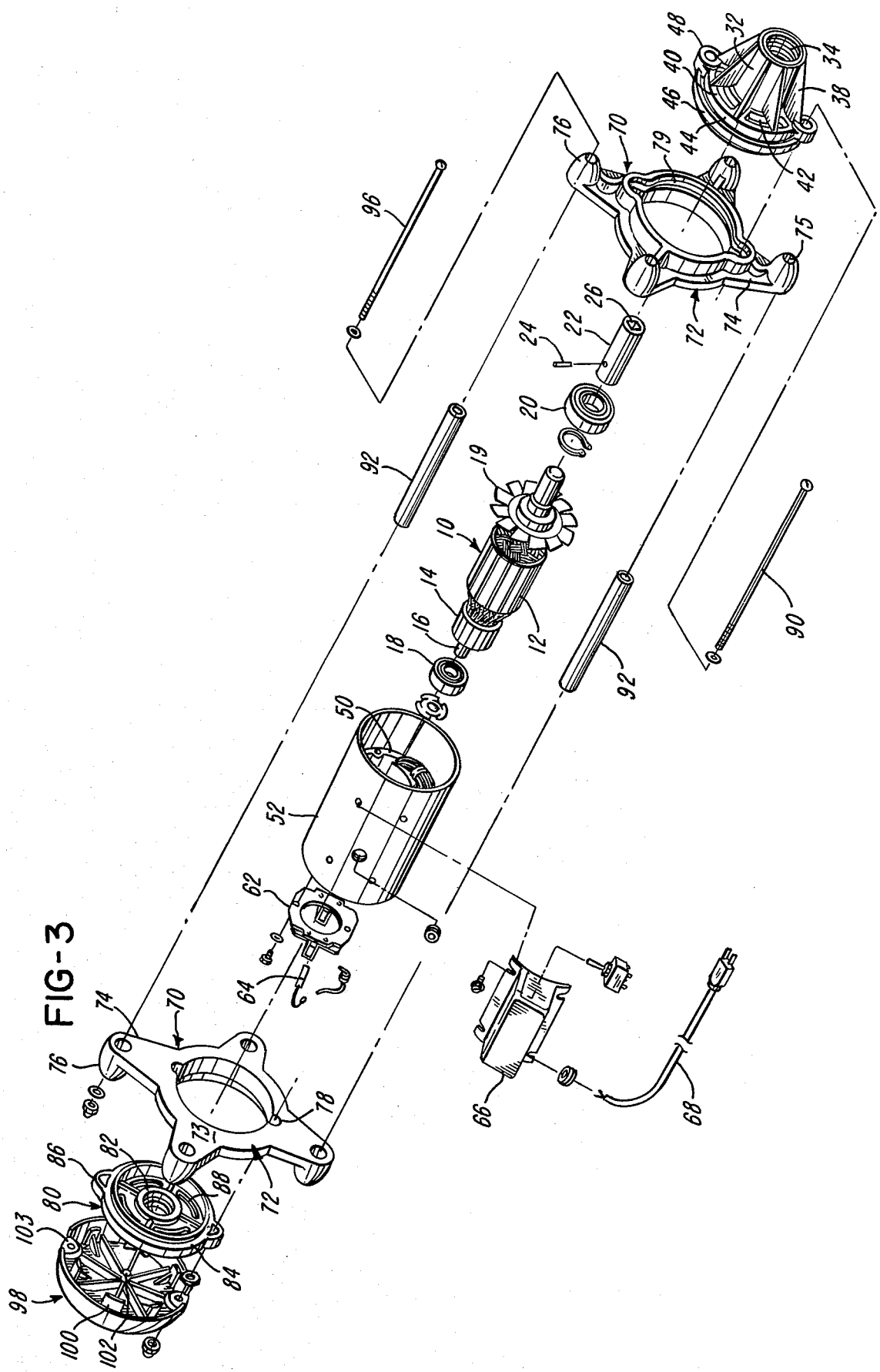
FIG. 3 is an exploded view of the unit.

The drive motor unit illustrated includes a conventional armature assembly 10 comprising an armature 12 and commutator 14 fixed to and about a drive shaft 16. The commutator end of the armature assembly positions in immediately adjacent but spaced relation to a bearing unit 18, the inner race of which is fixed peripherally of one end of the shaft 16. The opposite end portion of the shaft 16 projects beyond the end of the armature assembly remote from the commutator to fixedly mount thereon and thereabout, in spaced relation to the armature assembly, a bladed fan element 19. Fixed about the shaft 16 immediately beyond and in closely spaced relation to the fan element 19 is the inner race of a second bearing unit 20. The projected extremity of shaft 16 remote from the commutator and the bearing unit 18, which lies immediately beyond the bearing unit 20 nests in a socket in one end of a drive sleeve 22, to which it is fixed by a radially applied pin 24.

The sleeve 22, which is thereby connected with and forms an axial extension of the shaft 16, is formed with a longitudinally extended pocket 26 in its outermost end which is rectangular in transverse section to accommodate and have connected thereto the complementarily shaped driven end of a flexible shaft 28 the remote end of which connects, in the application illustrated, to the eccentric embodied in an internal vibrator (not shown).

The outer race of the bearing unit 20 is press fit in one end of the bore of a sleeve 32 formed of high impact strength plastic, such as sold under the trademark "Lexan", to abut the innermost end of a metal sleeve-like insert 34 fixed in the opposite end of the sleeve 32 to have its outermost end terminate at the outermost end of this sleeve. The inner surface of the insert 34 is formed with a thread for threaded engagement therewith of the adapter end portion 36 of the sleeve-like protective cover of the flexible shaft 28 the driven end of which is applied to the drive sleeve 22.

The sleeve 22 is also formed of high impact strength plastic such as Lexan and provides an insulating barrier between the shaft 16 and the applied flexible shaft 28.

Formed integral with and projected radially of the outer surface of the sleeve 32 is a series of circumferentially and equidistantly spaced fins 38 of generally right triangular shape. The apex ends of the fins lie at the projected extremity of the sleeve 32 and the fins extend longitudinally and inwardly of the sleeve length to have their base ends integrate and merge with a radially projected annular skirt 40 molded integral with the outer surface of the sleeve 32, in adjacent spaced relation to the end thereof in which is press fit the bearing unit 20. The radial extent of skirt 40 is of the same dimension as that of the base of the fins 38. The skirt 40 is formed to include therein arcuate slots 42, in circularly spaced relation, immediately of its outer periphery. This provides air passages therein between the circularly spaced integrated ends of the fins.

The skirt 40 has a flange 44 integral with its outer peripheral edge which projects concentrically about the sleeve 32 towards but terminates in spaced adjacent relation to the plane of its inner end. Circularly spaced radial ribs integrate with and extend between the outer surface portion of the sleeve 32 bounded by the flange 44 and the inner surface of the flange. Formed integral with and peripheral to the outer surface of flange 44 intermediate its axial limits, is an annular cup-like projection 46 the base of which lies most adjacent the plane of the inner end of sleeve 32. A radially projected ear 48 is formed at each end of an outer diameter of the composite of the flange 44 and projection 46. Each ear 48 has a socket formed in its surface facing the plane of the outermost end of sleeve 32 in which is press fit a metal sleeve the bore of which is extended by a through bore in the ear. The purpose of this will soon be obvious.

The armature assembly 10 is designed to slip fit within and concentrically of a sleeve-like field assembly 50 to be immediately bounded by the diametrically opposite pole pieces thereof. The field assembly 50 nests in turn in a cylindrical shell 52. The latter is a thin walled structure formed of high impact strength insulating plastic material such as "Lexan" and embodies in integrally molded relation to its inner surface, adjacent the end thereof remote from that in which the armature assembly is applied in assembly of the motor drive unit, two pair of apertured ears, the ears of one pair being designated as 54 and the other as 56 in the accompanying drawings. The ears 54 are co-planar, diametrically opposite and serve as an abutment against which one end of the field assembly 50 seats as it is assembled to the shell 52. When the assembly 50 is properly seated, bores provided therein, the length thereof, accommodate the application therein of the bodies of applied screws 60 the heads of which abut one end of the field assembly 50 (washers being applied therebetween) as their threaded projected extremities pass through apertures in the ears 54 aligned therewith. Nuts are applied to the screws 60 to clamp to the ears 54 and releasably secure the field assembly 50 within and to the shell 52 thereby. As thus fixed the field assembly 50 lines the shell 52 at a location intermediate and spaced from its respective ends.

The ears 56 lie immediately of and in spaced relation to the ears 54 at locations spaced 90° from the respective positions of ears 54 and adjacent the end of the shell 52 remote from that end in which is inserted the armature assembly including the drive shaft 16.

A centrally apertured plate 62 of plastic material which forms the base of a brush assembly 64 is fixed by screws to the surface of ears 56 outermost of the shell 52. The brush assembly 64 is conventional, including diametrically opposed and spaced brushes which are spring biased towards each other and directed towards the aperture centrally of the plate 62. The armature wiring is suitably connected with the conductive brush devices and its input leads are projected from the shell 52 by way of an aperture therein into a plastic switch housing 66, fixed by electrically non-conductive screws to the exterior of shell 52. Within the housing 66 a switch is inserted in one lead and both leads are projected from the switch housing in a cable form 68. The exposed toggle operator control for the switch is electrically non-conductive so the operator of the drive unit is isolated also in this respect from any transmission to his body of electrical energy. The projected ends of the leads attach to a conventional male plug serving for the connection thereof to an available source of power.

Slip fit over the end of shell 52 remote from that end embodying therein the ears 54 and 56 is a rubber mount 70. The mount 70 is molded to comprise an inner ring portion 72 having formed in connection therewith a series of four radially projected co-planar arms 74 of generally symmetrical triangular configuration in the plane of the ring portion 72. The face 73 of the ring and its integrated arms positioning innermost of the end of the shell 52 to which it mounts is in a single plane perpendicular to the central axis of the shell. The outer rounded apex ends of the arms 74 have bullet-like projections 76 at the face thereof remote from the face 73. There is a small diameter through bore in each apex end of these arms 74 and through the axial center of its projection 76 and a large diameter counterbore 75 in the end of this bore opening from the face 73. The inner surface of the ring portion 72 has two notches 78 therein which are spaced 180° apart, the purpose of which will be made obvious. The face of the ring portion outermost and remote from its end or face portion included in the surface 73 has its outer peripheral edge portion formed to include an axial annular projection, providing that its inner edge portion forms thereby a recessed shoulder 79 facing outwardly of the rubber mount and the end of the shell 52 to which it mounts. This axial annular projection and the bullet-like projections on the rubber mounts are bridged by ribs at the face of arms 74 remote from the face 73. The apex or nose portions of each bullet-like projection on the arms 74 also have a counterbore producing a pocket and a recessed annular shoulder facing outwardly thereof.

When the field assembly 50 is slip fit into the shell 52 to line its interior, intermediate its ends, and is connected as above described; the plate 62 mounting the brush assembly 64 is also secured in place; and the one motor mount 70 is applied about the end portion of the shell 52 remote from the brush assembly, the shoulder 79 will be positioned co-planar with the end face of the shell 52 which it rims. One can then apply the armature assembly including the drive shaft 16 and the connected bearing units 18 and 20, commutator end first, through the open end of the shell 52 through which the field assembly has been first applied. The armature assembly will have connected therewith, at this point, the sleeve 32 and its integrated structure which is press fit in connection with the outer race of the bearing unit 20. Also the drive sleeve 22 will be connected, forming an axial extension of shaft 16 which positions its outer projected end with the limits of the internally threaded insert 34. This completely interconnected structure embodying the armature assembly is effectively provided at this point as a unitary structure. This unitized structure is easily held by grasping the Lexan cup structure including the finned sleeve 32 as the armature assembly is advanced within the sleeve. As the armature assembly is brought to its desired position the bearing 18 in advance of the commutator passes between the commutator brushes, which are spread to this end, and positions immediately outward of the adjacent end of the shell 52. At the same time the commutator bars position between the brushes 64 which are spring biased for an inherent positive contact therewith as the armature positions within the pole pieces of the field assembly 50. The base end of the annular cup-like projection 46 simultaneously seats to and abuts with the facing end of shell 52 and the shoulder 79 on the adjacent motor mount, the ears 48 nesting in appropriate seats defined at the outer face of the motor mount embodying openings to and in direct alignment with the respective notches 78.

A second motor mount 70 is mounted about the end of the shell 52 remote from the motor mount 70 first described. This second mount is identical to the first and has its planar face 73 facing that of the first described motor mount.

The end of the shell 52 from which projects the end of the motor drive shaft mounting the bearing unit 18 is covered by a "Lexan" cap or cover plate 80. The latter has a shallow dome or cup shape the center of the base of which has an integrally molded cup-like portion 82 the base of which projects outwardly of the center of plate 80 and includes a small central aperture. Seated to the base of the cup portion 82 is a spring washer. In application of the plate 80 the cup portion 82 receives and nests therein, in frictional connection therewith, the outer race of the bearing unit 18. The end face of the shell 52 adjacent, peripheral to and offset from the bearing unit 18 is stepped inwardly of shell 52 at its inner edge portion to seat within the shell 52 an annular projection at the inner edge portion of the peripheral wall of the cupped cap plate 80. Integrated with the outer periphery of the peripheral wall of the cap portion 80 is a flange-like radial projection 84 the base of which seats to the facing end face portion of the shell 52 and the shoulder portion 79 of the surrounding inner ring portion of the adjacent mount 70. Also included at the outer periphery of the cap element 80 are diametrically spaced ears 86 adapted to seat to the adjacent shoulder 79 of the second described motor mount in areas formed to accommodate the same and to provide that apertures therein align with notches 78. Also formed in the base of the cap plate 80 are four circularly and equidistantly spaced arcuate slots 88 providing air inlet vents.

The application of the cap plate 80 completes the confinement of the armature assembly 10 since as it caps the one end of shell 52, the opposite end is capped by the Lexan structure embodying the sleeve portion 32. Air passages are provided to either end of the shell 52 by the slots 42 and 88.

Metal tubes 92 are applied between aligned pairs of arms 74 of the motor mounts to space the same, seating their respective ends in facing counterbores 75 at the outer ends of the paired longitudinally spaced arms. A screw 96 is applied through the bore in each apex end of each arm 74 embodied in connection with one motor mount 70 and through the projection 76 thereon to seat the head of the screw in the pocket defined in the nose of the projection as the body of the screw threads through the connected tube 92 and the bore in the apex of the longitudinally spaced arm 74 of the second motor mount aligned therewith. A nut applied to the projected extremity of each screw seats in the pocket in the nose of the bullet shaped projection of the aligned arm of the second motor mount.

The application of the screws 96 and the applied nuts, as described, serve to clamp the motor mounts to the tubes 92 to firmly space and establish the mounts in protective positions to and about the shell 52 and its contained structure. By the same token, the elements of the drive motor as well as the mounts 70 are securely contained and clamped in place on application of further screw 90 in a manner to be described.

A dome-shaped plate 98 formed of "Lexan" or equivalent material which is electrically non-conductive is applied to form a shield for the commutator, over and in spaced relation to the outer face of the cap plate 80. At the center of its concave inner face the plate 98 has formed integral therewith a short projected pin 102 the projected extremity of which seats to the center of the base of the cup portion 82 on application of the shield. This maintains a spacing between the shield 98 and the cap or cover 80. Mounted integrally with and projected from the inner surface of the plate 98, adjacent its outer peripheral edge, is a series of circularly spaced plate segments 100 each formed as a longitudinal segment of a cylindrical shell. The segments 100, if joined in a circular sense, would form a short cylindrical wall concentric to and about the pin 102. The axial length of the segments 100 cause them to mutually project outwardly of the concave side of plate 98. In the application of the shield to the cover plate 80 the projected extremities of the plates 100 are applied to bear about and on the outer peripheral wall surface of the cup shape of the plate 80 and seat in an annular groove 101 formed in the peripheral projection therefrom. Flatted apertured portions 103 provided at the periphery of the plate 98 seat over the ear portions 86 as the shield is applied.

Particular attention is directed to the fact that the pin 102 achieves the spacing of the shield so as to provide for free air to pass into the shell 52 by way of the slots 88. A feature of advantage is that air passing inwardly through the slots 88 will find the concave inner surface of the dome shape of the shield 98 effective to insure its rapid flow inwardly of the drive unit between the outer peripheral edge of the plate 80 and the lip at the base of the plate 98.

The bodies of headed screws 90 are applied in obvious fashion through the aligned apertured ears 48 and 86 and shield portions 103 which as the parts seat align with motor mount notches 78, the latter permitting free passage of the screws as the screw heads seat in the pockets opening outward of ears 48 and a nut is applied in each case to the projected end of the screw outwardly of the portions 103 of the shield. The suitable rotation of the nuts on the screws will not only clamp the end cover elements over the respective ends of shell 52 and the shield 98 in place but will also serve to establish the inner ring portion of the electrically non-conductive motor mounts in place, in obvious fashion.

The foregoing description should highlight the features of the present invention by way of illustration. Particular note is to be taken of the fact that the construction of the parts and their assembly is such as to facilitate a most simple fabrication and connection thereof. The parts are minimal in nature and embodied therein are means which fully isolate the armature assembly from any device to which the shaft means serving as the driver portion of the motor unit may be coupled. Even in coupling of a connected device, the transmission of a source of electrical shock from the connected device is precluded due to the fact that both the driver portion of the shaft means and the surrounding sleeve forming part of the end cover plate for the shell are fully made of electrically non-conductive material. The shell 52 is very simply clamped between the non-conductive end cover plates and serves itself to support the electrically non-conductive motor mounts which are resilient in nature and also contained by the end cover plates in the assembly of the unit. The hand holds 92 are thus clearly divorced from any potential conductive relation to any portion of the drive unit or a connected device.

Note further the unique assembly of the armature and commutator means in connection with the shaft which does not have nor does it require an insulating sleeve between the armature assembly and the shaft. The necessity for such a sleeve is obviated by the described structure. Nor are there required any metal bearing sleeves in connection with the end cover plates, as are normally provided in prior art devices. There is a simple friction fit and surface contact between the outer races of the bearings and the non-conductive material of the end cover plates.

Even further, the shaft means embodied in connection with the armature assembly has fixedly connected therewith, within the housing of the driver unit, a fan means and together with the form of the end plates enables a cooling system of extreme importance, one which is effective at all times and preserves the condition of the elements of the motor drive unit, insuring against deterioration.

Not only is there a plural insulation electrically, but critical working parts of the drive unit are protected from environmental influence as well as mechanical shock damage to a maximum degree.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A drive motor unit for an internal vibrator or like device comprising a tubular shell of non-conductive material each end of which has a separate cover element of non-conductive material, a cylindrical structure defining a field assembly having in electrically conductive connection therewith brush means and means for coupling thereto a source of power, said field assembly having a releasable slip-fit mount within and connection to an inner portion of said shell, an armature assembly within said field assembly having in electrically conductive relation thereto commutator means, to which said brush means are applied, said armature assembly having in connection therewith shaft means, said shaft means being supported and capped at one end by one of said cover elements, the other end of said shaft means having an axial extension defined by an electrically non-conductive element mounted to extend said shaft means within the other of said cover elements, said element defining an axial extension being effective on coupling of a source of power to said field assembly to block flow therethrough from said shaft means of electrical energy and said electrically non-conductive element forming an axial extension of said shaft means providing the output from said shaft means and said motor.

2. A drive motor unit as in claim 1 wherein said shell includes means for positioning said cylindrical structure defining said field assembly on the slip-fit thereof to its inner wall surface and said separable cover elements include apertures for flow therethrough of cooling air.

3. Apparatus as in claim 2 wherein bearings for said shaft means have their outer races contained in pockets in said separable cover elements in direct contact with the electrically non-conductive material of said cover elements and their inner races fixed to end portions of said shaft means, said electrically non-conductive axial extension of said shaft means is located within said other of said cover elements immediately outward of said bearing means the outer race of which is contained therein and said armature assembly is fixed to and about said shaft means intermediate said bearing means.

4. Apparatus as in claim 3 wherein said shell and said separable cover elements define a housing mounting thereon, in a longitudinally spaced relation, resilient motor mounts portions of which project in a radially and circumferentially spaced relation and have in bridging connection relation thereto spacers which maintain their spaced relation and provide a plurality of longitudinally extending circumferentially spaced hand holds for said motor drive unit which lie intermediately of the ends of and clear of said housing, said separable cover elements being releasably connected to contain therebetween said shell.

5. Apparatus as in claim 1 wherein the inner wall surface of said shell includes, adjacent one end thereof, short projections in longitudinally spaced planes, said cylindrical structure being constructed and arranged to slip-fit through the opposite end of said shell to abut and be releasably connected to at least one of said short projections to establish the required position of said field assembly within said shell and said brush means mount to other of said projections adjacent said one end of said shell, portions of the respective ends of said shaft means have in connection therewith bearing means which respectively nest in said separable cover elements, said armature assembly, said shaft means and the bearings connected to said shaft means forming a unit which may be slip-fit within and to said shell to position said commutator means within and in contact with said brush means as said armature assembly locates within said field assembly.

6. Apparatus as in claim 1 wherein said shell mounts, at each of the opposite ends thereof, longitudinally spaced resilient motor mounts which project radially and circumferentially thereof and have in bridging connected relation thereto spacers which provide a plurality of longitudinally extending circumferentially spaced hand holds for said motor drive unit which lie intermediately of and clear of said separable cover elements which are releasably connected to contain therebetween said shell.

7. Apparatus as in claim 6 wherein said mounts include ring-shaped inner portions which fit about end portions of said shell and outer portions in the form of radially projected arms arranged in opposed pairs to be bridged by and maintained in a spaced relation by said spacers.

8. Apparatus as in claim 7 wherein a shield is fixed to and in a spaced relation to the separable cover element most adjacent said commutator and brush means and said shield embodies means to afford a guided mount thereof to and in connection with the separable cover element to which is fixed, said shield defining a chamber with the separable cover element to which it is fixed, openings to which are respectively provided at a peripheral portion of said chamber and in the cover element to which said shield is fixed.

9. A drive motor unit according to claim 1, said shell having means in connection therewith defining a plurality of projections directed inwardly thereof, a first portion of said projections forming a seat adjacent one end of said shell to which said field assembly is abutted and fixed and a further portion of said projections spaced from said first portion of said projections providing a mount for means including said brush means applied to said commutator means which forms part of said armature assembly.

10. A drive motor unit according to claim 1, said separable cover elements having resilient means mounted thereto, respectively, and projecting substantially radially of said, shell at the exterior thereof, and means mounting between, spacing and bridging portions of said projecting resilient means which together with said resilient means are constructed and arranged to provide a resilient mount for said motor unit embodying handle means which are thereby non-conductively related to said armature assembly and generally coextensive with and spaced outwardly from said shell.

11. A drive motor unit according to claim 10 wherein said resilient means mounting to said separable cover elements are separable from said separable cover elements, spaced at their outer limits by said handle means and clamped between said separable cover elements at the inner limits thereof.

12. A drive motor unit according to claim 11 wherein said shell, said separable cover elements, said resilient means and said means bridging portions of said projecting resilient means are constructed and arranged to be separable from one another on removal of said separable cover elements from said shell and means interconnect and apply pressure to contain said separable cover elements to each other and with reference to the respective ends of said shell to thereby clamp said resilient means, and the bridging means which extend therebetween, in an area generally within the limits of said separable cover elements.

13. Apparatus as in claim 1 wherein said other of said separable cover elements includes an axial extension projected outwardly with reference to said shell, about and in spaced relation to a sleeve which provides the element forming an axial extension of said other end of said shaft means and said extension of said other of said separable cover elements embodies means for coupling thereto a protective cover for the operating portion of the tool device which may be coupled to said sleeve for the utilization thereby of the output of said drive motor.

14. Apparatus as in claim 1 wherein said other of said cover elements includes a base portion abutted to the end of said shell to which it applies and a central aperture extended by an axial extension thereof in a direction outwardly from said shell, said central aperture has nested in the innermost end thereof a bearing means for an end portion of said shaft means which is axially extended by said electrically non-conductive element which is applied thereto, said axial extension of said other of said separable cover elements is in surrounding spaced relation to said axial extension of said shaft means and the outer limit of the latter of which provides means for coupling thereto the drive element of an internal vibrator or like tool device.

15. Apparatus as in claim 14 wherein said axial extension of said other of said cover elements embodies means for coupling thereto a protective cover for the portion of the tool device which is coupled to said axial extension of said shaft means.

* * * * *

UNITED STATES PATENT AND TRADEMARK OFFICE
CERTIFICATE OF CORRECTION

PATENT NO. : 4,384,224

DATED : May 17, 1983

INVENTOR(S) : Clem Spitler and Ralph Farkas

It is certified that error appears in the above—identified patent and that said Letters Patent is hereby corrected as shown below:

Col. 1, line 52, "cover" is corrected to read -- covers --.

Col. 1, the following paragraph is inserted immediately following line 50 and prior to line 51:

---   A preferred embodiment of the invention unit for drive of the flexible drive shaft of an internal vibrator embodies a field assembly which slip fits in a cylindrical shell which includes positioning means to which the field assembly and electrically connected commutator brush means may be releasably fixed. Slip fit as a unit into this shell is an armature assembly including a commutator means fixedly mounted directly to and about shaft means intermediate its ends. One end portion of the shaft means provides an electrically non-conductive coupling device for drivingly relating the shaft means to a device which must be powered. The shaft means has affixed thereto the inner races of bearing means to either end of the armature assembly the outer races of which are in direct contact with and protected by electrically non-conductive material forming part of end

UNITED STATES PATENT AND TRADEMARK OFFICE
CERTIFICATE OF CORRECTION

PATENT NO. : 4,384,224  
DATED : May 17, 1983  
INVENTOR(S) : Clem Spitler and Ralph Farkas Page 2 of 3

It is certified that error appears in the above—identified patent and that said Letters Patent is hereby corrected as shown below:

covers for said cylindrical shell. The end covers are slotted and fan blade means are fixed directly to said shaft means to produce a cooling flow of air about the drive unit components. The preferred drive unit also embodies rubber, electrically non-conductive, motor mounts ring-shaped base portions of which seat about and are contained to the shell by electrically non-conductive end covers. Projecting radially from the ring-shaped base portions are arms spaced by tube elements which provide electrically insulated hand holds for said drive unit between and clear of said end covers. -- .

Col. 2, line 62, insert -- a counterbore in -- following "in".

Col. 2, line 65, delete ", to abut the innermost end of" and substitute -- . A counterbore in the opposite end of sleeve 32 fixedly nests --;

Col. 2, line 66 to 67 delete "fixed in the opposite end of the sleeve 32 to have its" and substitute -- the --;

Col. 2, line 67, insert -- of which -- following "end"; same line "terminate" is amended to read -- terminates --.

UNITED STATES PATENT AND TRADEMARK OFFICE
CERTIFICATE OF CORRECTION

Figure 4:
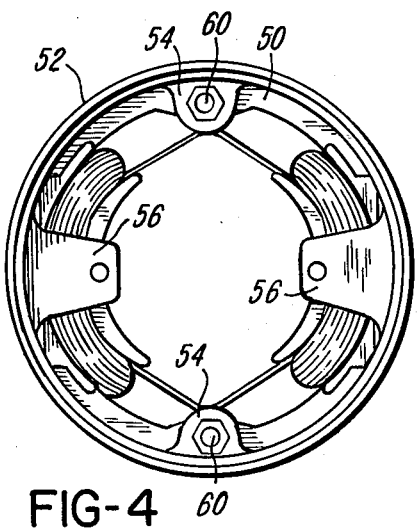
FIG. 4 is a sectional view taken along line 4—4 of FIG. 2.
Figure 7:
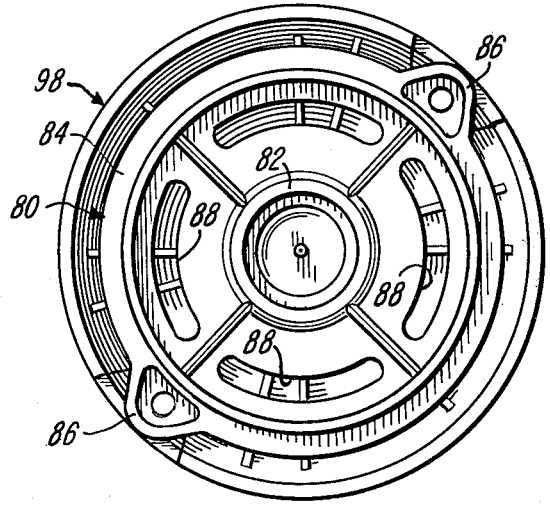
FIG. 7 is a view taken on line 7—7 of FIG. 2.
Figure 5:
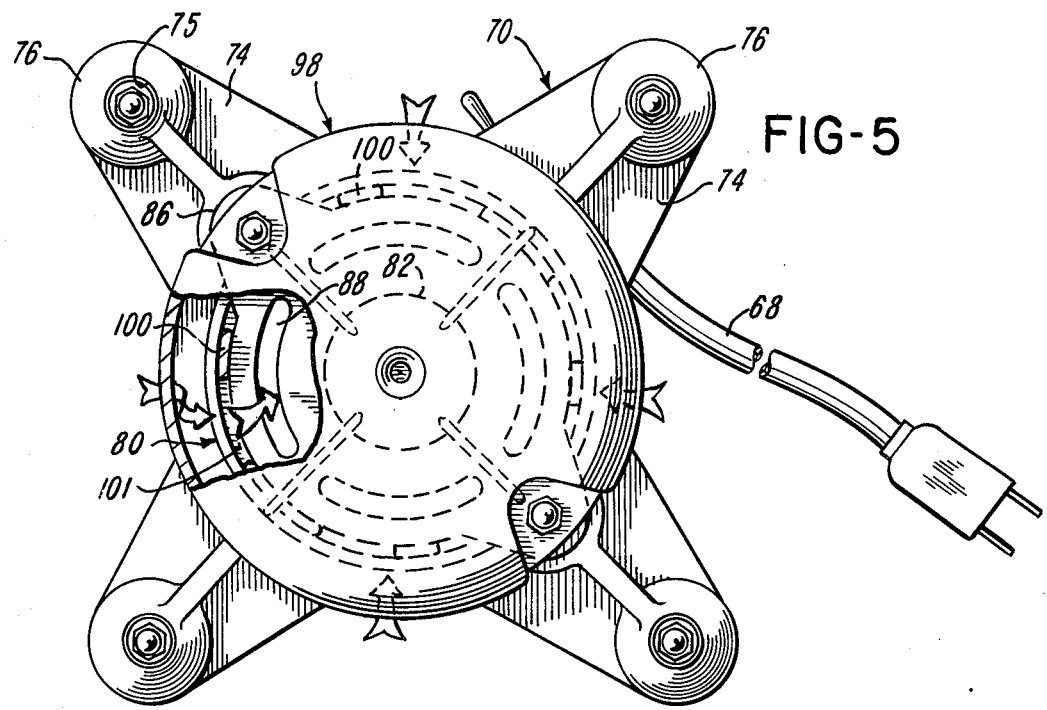
FIG. 5 is a view of one end of the unit.
Figure 6:
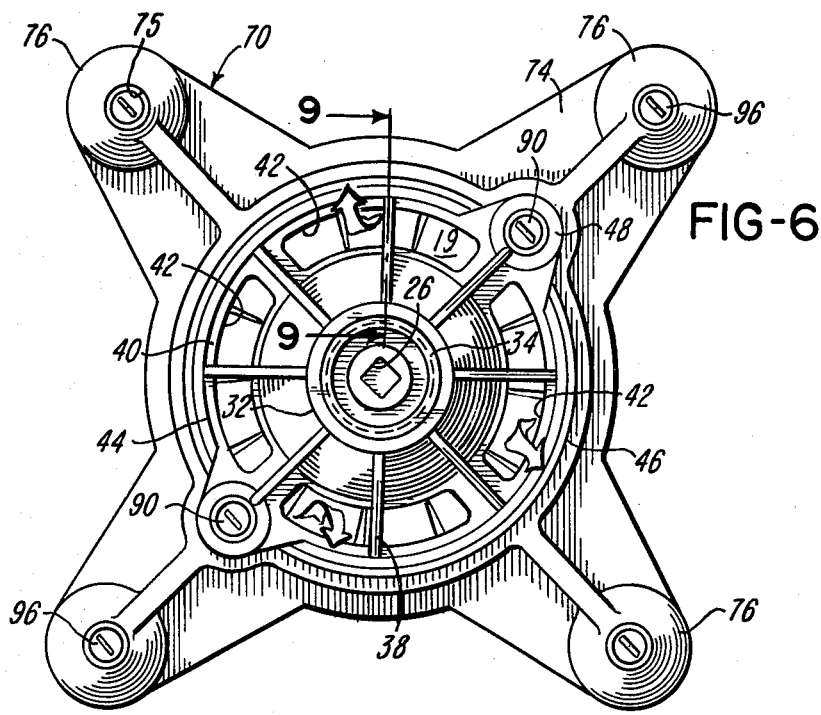
FIG. 6 is a view of the opposite or drive end thereof, parts being omitted for clarity.

PATENT NO. : 4,384,224
DATED : May 17, 1983
INVENTOR(S) : Clem Spitler and Ralph Farkas It is certified that error appears in the above—identified patent and that said Letters Patent is hereby corrected as shown below:

Col. 3, line 54, insert -- (Fig. 4.) -- following "drawings".

Col. 5, line 6, "with" is corrected to read -- within --.

Col. 5, line 12, delete "sleeve" and substitute -- field assembly --.

Col. 6, line 20, "screw" is corrected to read -- screws --.

Figure 8:
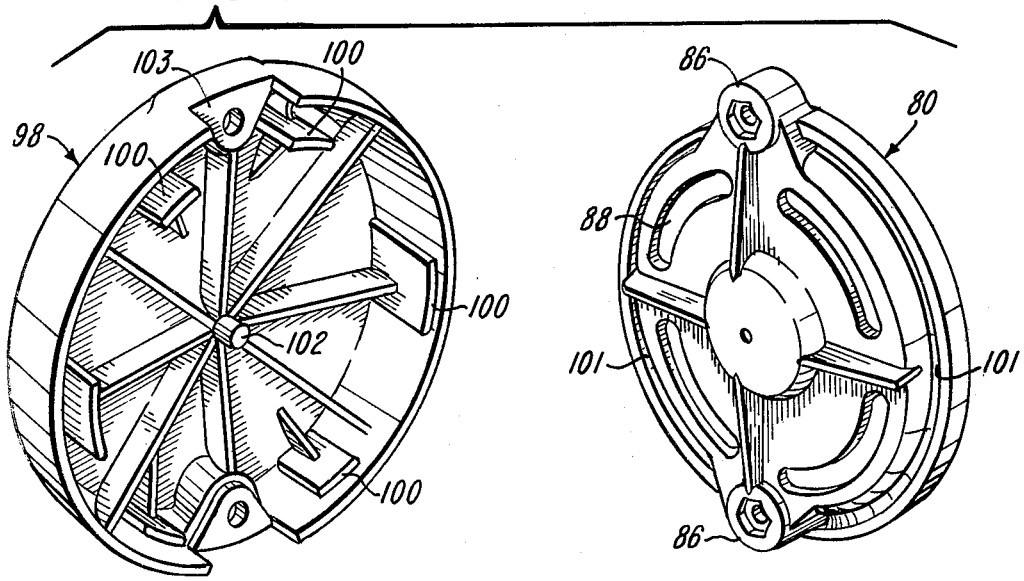
FIG. 8 is a perspective view illustrating the interrelation of the commutator shield and cover observed in FIG. 5.
Figure 9:
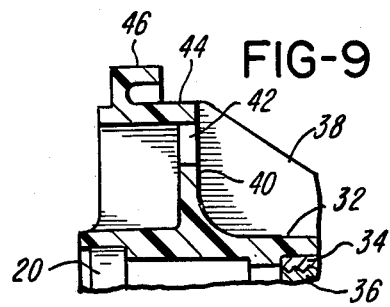
FIG. 9 is a view taken on line 9—9 of FIG. 6.

Col. 6, line 43, -- (Fig. 8) -- is inserted following "101".

Col. 6, line 67, "portion" is corrected to read -- portions --.

Col. 8, line 1 (Claim 1, line 3), "separate" is corrected to read -- separable --.

Col. 8, line 44 (Claim 4, line 6), "connection" is corrected to read -- connected --.

Signed and Sealed this

Eighth Day of November 1983

[SEAL]

Attest:

GERALD J. MOSSINGHOFF

Attesting Officer   Commissioner of Patents and Trademarks